UNITED STATES PATENT OFFICE.

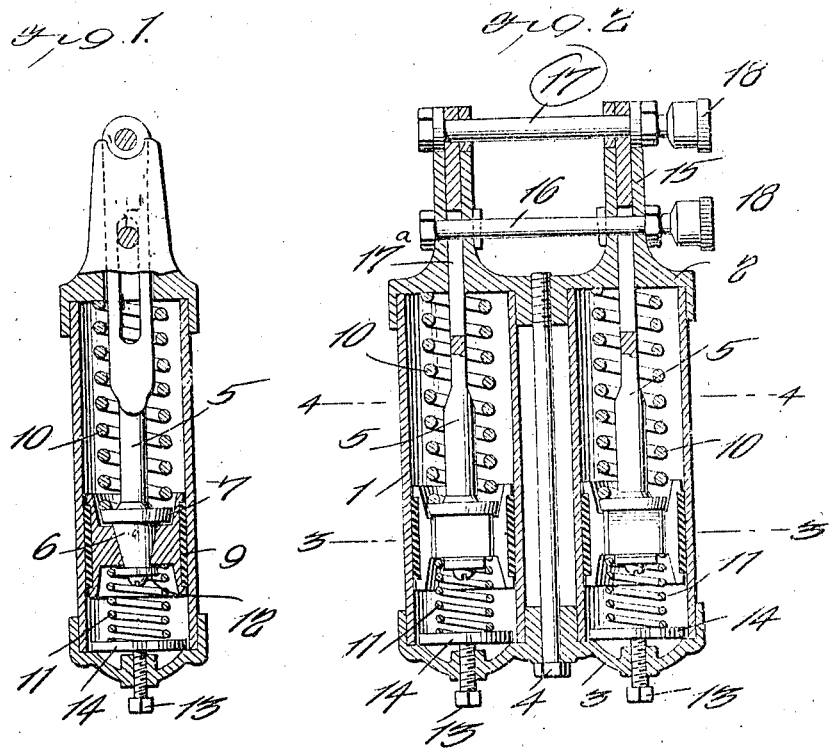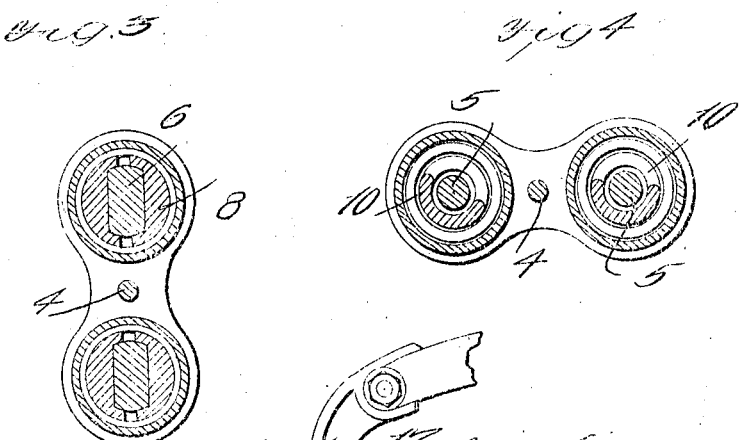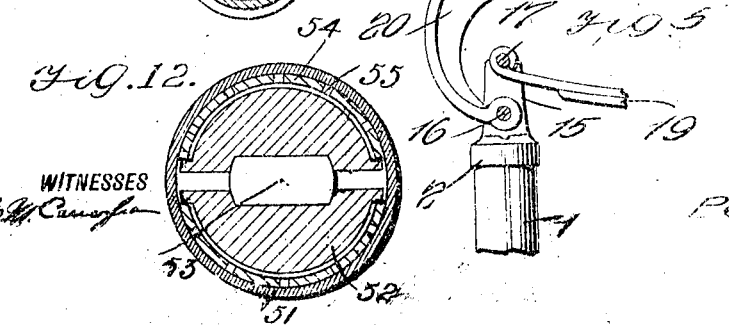

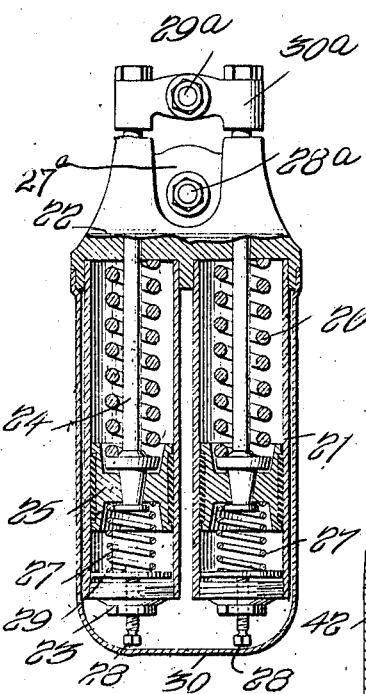

PERCY TODD, OF GADSDEN, ALABAMA.

SHOCK-ABSORBER.

1,292,539.    Specification of Letters Patent.    Patented Jan. 28, 1919.

Application filed July 11, 1917. Serial No. 179,819.

*To all whom it may concern:*

Be it known that I, PERCY TODD, a citizen of Great Britain, and a resident of Gadsden, in the county of Etowah and State of Alabama, have invented new and useful Improvements in Shock-Absorbers, of which the following is a specification.

My invention is an improvement in shock absorbers, and has for its object to provide mechanism of the character specified, capable of application to motor vehicles of every character, for cushioning the upward movement of the vehicle with respect to the body and for cushioning the recoil.

In the drawings:

Figure 1 is a longitudinal section through one embodiment of the invention;

Fig. 2 is a section at right angles to Fig. 1;

Figs. 3 and 4 are sections on the lines 3—3 and 4—4, respectively, of Fig. 2;

Fig. 5 is a partial side view showing the manner of attaching the absorber to cars having semi-elliptical springs;

Fig. 6 is a sectional view of a modified form;

Fig. 7 is a side view of the same, with parts in section;

Fig. 8 is a longitudinal section of another embodiment of the invention, showing the manner of attachment to a Ford car;

Fig. 9 is a section on the line 9—9 of Fig. 8;

Fig. 10 is a view similar to Fig. 5, showing the manner of attaching the absorber to cars having platform springs;

Fig. 11 is a side view of the wedge shaped plunger and its attachments;

Fig. 12 is a sectional view showing a modified form of brake device.

In the embodiment of the invention shown in Figs. 1 to 4, inclusive, two similar cylinders 1 are provided, the ends of the cylinders being closed by common heads 2 and 3 which are connected together and held on the cylinders by means of a screw bolt 4 which is passed through the heads between the cylinders.

A plunger rod 5 is mounted in each cylinder to move through the head 2, and each plunger rod is provided at its lower end with a wedge shaped plunger 6 and with a marginal rib 7 above the plunger. Each plunger moves between the sections 8 of an expander, the said sections being similar, as shown.

A brake ring 9 of suitable material encircles the sections of each expander, being held in grooves in the sections, as shown, and the expander sections are reamed at their tops and bottoms, the ribs 7 seating in the upper reamed portions. A coil spring 10 is arranged in the cylinder between the rib 7 and the head 2, the said spring acting normally to force the plunger downwardly, and a second, lighter spring 11 is arranged in each cylinder below the plunger, the said spring at its upper end engaging within the reamed portions of the expander sections.

It will be noticed that each wedge is provided with a stop 12 in the form of a washer held at the bottom of the same by a screw, the washer extending beyond the opening between the sections and engaging the sections when the plunger is moved upwardly to move the sections with the plunger. The rib 7 acts as a stop above the expander sections.

The tension of the spring 11 may be varied by means of a set screw 13 which is threaded through the head 3 at the spring, and the lower end of the spring rests upon a disk 14 with which the screw coöperates.

The head 2 has an upward guide extension 15 at each plunger, and the upper end of each plunger stem moves in the adjacent guide. A bolt 16 is passed transversely of the extensions just above the head, and the said bolt passes through longitudinally extending slots 17ª in the plunger stems. A second bolt 17 is connected with the upper ends of the stems, and the parts may be lubricated by means of grease cups 18 on the ends of the bolts.

In Fig. 5 is shown the manner of attaching the device to a car having semi-elliptical springs. In this instance the bolt 17 is passed through the eye at the end of the spring 19, and the bolt 16 is passed through an eye in the frame or spring supporting bracket 20.

If desired, four cylinders may be used, as shown in Figs. 6 and 7. In this construction each pair of cylinders 21 is closed at its top by a head 22 and at its lower end each cylinder is closed by a threaded plug 23. The plunger 24 and expanders 25 are similar to the construction of Fig. 1, and springs 26 and 27 are similar to the springs 10 and 11 and operate in the same manner.

The set screws 28 which regulate the tension of the springs 27 are threaded through the plugs 23 and engage disks 29 on which the lower ends of the springs seat. A case 30 is provided for inclosing each pair of cylinders, each case being substantially cup shaped and engaging at its top outside the depending flange of the head 22.

The upper ends of the plungers of each pair of cylinders are connected by a yoke 30ª, and a bolt 29ª corresponding to the bolt 17 is passed through the yokes, the said bolt being adapted for connection with one of the elements between which the absorber is arranged. The bolt 28ª which corresponds to the bolt 16 of Fig. 2 is passed through bearing lugs 27ª on the heads 22.

In the embodiment of the invention shown in Figs. 8 and 9, which is especially adapted for Ford cars, the cylinder 31 is closed at its bottom by a head 32 having an arm 33 for connection with a frame 34. A plunger 35 which corresponds to the plunger 24 of Fig. 6 is reversely arranged, however, the stem 36 of the plunger extending through the head 32 and the end of the stem is connected by hangers 37 with the spring 38. A heavy spring 39, corresponding to the spring 10 of Fig. 1, is arranged between the plunger and the head 32, while a light spring 40 is arranged between the expander 41 and a disk 42, which is engaged by a set screw 43 to vary the tension of the spring. This set screw is threaded through a threaded plug 44 which closes the upper end of the cylinder, and a cap 45 is placed over the set screw.

In Fig. 10 is shown the manner of connecting the device to a vehicle having platform springs. In this arrangement the bolt 16 is connected to the spring 46 and a bearing 47 is arranged on the bolt 48. A bolt 49 passes through the bearing, and a hanger 50 is connected to the bolt 49.

In the embodiment of the invention shown in Fig. 12 the cylinder 51 has arranged therein the sectional expander 52, and the expander sections are adapted to be expanded by the wedge 53. These sections carry a brake ring 54 which is provided with openings 55 in which may be packed graphite to lubricate the cylinder and the brake device.

I claim:

1. A shock absorber comprising a series of cylinders, a wedge shaped plunger in each cylinder, a sectional expanding block with which each plunger coöperates, each block being movable with the plunger and having a limited movement with respect to the plunger, a spring normally forcing the plunger in a direction to cause the plunger to expand the sections, a lighter spring pressing the expander in the opposite direction to cause it to follow the plunger when it compresses the first named spring, a brake ring encircling the expander block, and means for tensioning the last named spring, the plungers being adapted to be connected with one element to be cushioned and the cylinders with the other.

2. A shock absorber comprising a series of cylinders, a wedge shaped plunger in each cylinder, a sectional expanding block with which each plunger coöperates, each block being movable with the plunger and having a limited movement with respect to the plunger, a spring normally forcing the plunger in a direction to cause the plunger to expand the sections, a lighter spring pressing the expander in the opposite direction to cause it to follow the plunger when it compresses the first named spring, a brake ring encircling the expander block, and means for tensioning the last named spring.

3. A shock absorber comprising a series of cylinders, a wedge shaped plunger in each cylinder, a sectional expanding block with which each plunger coöperates, each block being movable with the plunger and having a limited movement with respect to the plunger, a spring normally forcing the plunger in a direction to cause the plunger to expand the sections, and a lighter spring pressing the expander in the opposite direction to cause it to follow the plunger when it compresses the first named spring.

4. A shock absorber comprising a cylinder, a wedge shaped plunger therein, a sectional expander block with which the plunger coöperates, the said block having a limited motion with respect to the plunger, a spring normally forcing the plunger in a direction to expand the sections, and means for retarding the movement of the block with the plunger under the influence of the spring, said means being adjustable.

5. A shock absorber comprising a cylinder, a wedge shaped plunger therein, a sectional expander block with which the plunger coöperates, the said block having a limited motion with respect to the plunger, a spring normally forcing the plunger in a direction to expand the sections, and means for retarding the movement of the block with the plunger under the influence of the spring.

6. A shock absorber comprising a cylinder, a wedge shaped plunger therein, an expander block with which the plunger coöperates, the block having a limited motion with respect to the plunger, a spring normally forcing the plunger in a direction to expand the block, and means for retarding the movement of the block with the plunger under the influence of the spring.

PERCY TODD.

Witnesses:
R. A. POLGLOZE,
ERNEST SMITH.